United States Patent [19]

vanManen

[11] Patent Number: 4,693,657
[45] Date of Patent: Sep. 15, 1987

[54] AUTOMOTIVE PANEL BRACKET

[75] Inventor: Dick T. VanManen, Canandaigua, N.Y.

[73] Assignee: Voplex Corporation, Pittsford, N.Y.

[21] Appl. No.: 846,199

[22] Filed: Mar. 31, 1986

[51] Int. Cl.⁴ .............................................. F16B 15/00
[52] U.S. Cl. ...................................... 411/467; 52/508; 403/406.1; 411/477; 411/547
[58] Field of Search ................................ 411/466–468, 411/546, 547, 477; 52/508, 511, 714; 403/406.1, 407.1

[56] References Cited

U.S. PATENT DOCUMENTS

| | | | |
|---|---|---|---|
| 270,677 | 1/1883 | Johnson | 52/508 |
| 831,179 | 9/1906 | McDonagh . | |
| 1,689,223 | 10/1928 | Bauschard | 411/547 |
| 1,763,264 | 6/1930 | Shanks . | |
| 1,890,105 | 12/1932 | Yanchenko | 411/547 |
| 2,089,550 | 8/1937 | Hacker . | |
| 2,339,841 | 1/1944 | Deuchler et al. . | |
| 2,616,142 | 11/1952 | Tinnerman | 411/466 X |
| 2,940,712 | 6/1960 | Lloyd-Young | 411/477 X |
| 3,010,496 | 11/1961 | Bruce . | |
| 3,049,042 | 8/1962 | DeLynn . | |
| 3,172,238 | 3/1965 | Sandin | 52/714 |
| 3,242,788 | 3/1966 | Broder | 411/468 |
| 3,314,465 | 4/1967 | Bien | 403/406.1 X |
| 3,818,665 | 6/1974 | Rogers | 52/714 X |
| 4,043,247 | 8/1977 | Rowinski . | |
| 4,081,938 | 4/1978 | Bertacchi et al. | 52/714 X |
| 4,359,849 | 11/1982 | Goeman . | |
| 4,394,808 | 7/1983 | Thorsell . | |
| 4,516,371 | 5/1985 | Simpson | 52/508 X |

FOREIGN PATENT DOCUMENTS

| | | | |
|---|---|---|---|
| 776353 | 1/1968 | Canada | 411/466 |
| 2731300 | 1/1978 | Fed. Rep. of Germany | 52/508 |
| 990605 | 6/1951 | France | 411/477 |

OTHER PUBLICATIONS

"Motor Vehicle Monthly", May, 1926 issue, p. 68, FIG. 1.

Primary Examiner—Robert L. Wolfe
Assistant Examiner—Lloyd A. Gall
Attorney, Agent, or Firm—Stonebraker, Shepard & Stephens

[57] ABSTRACT

An automotive panel bracket 10 is formed from a strip having a central fold line 22 forming a double-walled stand-off 15 between a pair of base portions 11 and 12 interconnected with an automotive panel 20. A pair of confronting semi-cylindrical grooves 17 and 18 in double walled stand-off 15 form a generally cylindrical pilot hole 16 guiding a fastener 25 that extends through panel 20, through pilot hole 16 in stand-off 15, and into an automotive body 30 to which panel 20 is secured.

16 Claims, 5 Drawing Figures

AUTOMOTIVE PANEL BRACKET

BACKGROUND

Brackets with stand-offs are desirable for fastening automotive panels to bodies. Interior panels especially need fastener and bracket combinations that can bridge varying distances from the panel to the automobile body to which the panel is fastened. Several solutions for this problem have been proposed, but all of them have shortcomings as fasteners or cost more than is desirable. Also, as automotive panels and bodies change, fastener and bracket needs change; and the automotive industry is always looking for cheaper and better ways of fastening panels in place.

My automotive panel bracket solves automotive panel fastening problems with a simple device that is inexpensive to make and can readily be varied in dimensions. It interlocks securely with a panel and provides a stand-off and pilot hole so that a fastener, such as a screw, can extend through the panel, the bracket base, and the stand-off and into the automotive body to which the panel is secured. My bracket accomplishes all these functions simply and reliably at a minimal cost.

SUMMARY OF THE INVENTION

My automotive panel bracket is made of a single strip that is bent to form a double-walled stand-off between a pair of base portions. These have projections that extend into and interlock with the material of an automotive panel, and the double walls of the stand-off are each formed with semi-cylindrical grooves that confront to form a pilot hole for guiding a fastener through the panel, through the stand-off, and into the automotive body to which the panel is secured. A slit in the strip at the fold line between the double walls opens one end of the pilot hole, and a pair of semi-circular cutouts in the base portions open a base end of the pilot hole.

DRAWINGS

DETAILED DESCRIPTION

Figure 1:
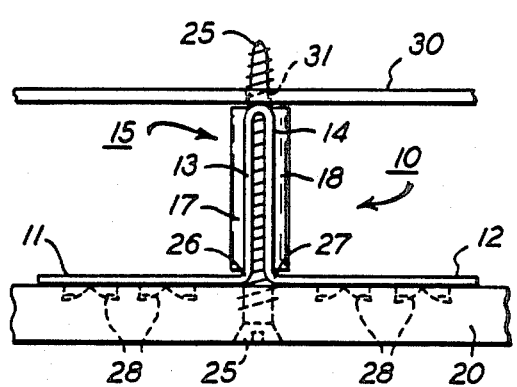
FIG. 1 is a side elevational view of a preferred embodiment of my automotive panel bracket supporting a fastener securing a panel to an automotive body.
Figure 2:
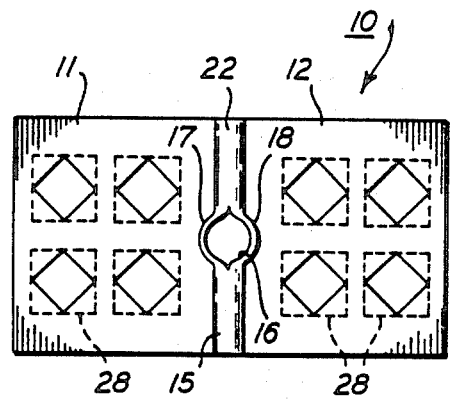
FIG. 2 is a plan view of the bracket of FIG. 1.

My fastener 10, as best shown in FIG. 1, interlocks with a panel 20, held away from automobile body 30, and accommodates a screw 25 that extends through panel 20, through bracket 10, and into body 30 to secure panel 20 in place. Bracket 10 is preferably made of a metal strip formed in a progressive die to have a pair of base portions 11 and 12 and a stand-off 15 formed of double walls 13 and 14. Extending through stand-off 15 is a pilot hole 16 formed by semi-cylindrical grooves 17 and 18 formed respectively in walls 13 and 14 so that grooves 17 and 18 confront, making pilot hole 16 generally cylindrical. A slit 21, formed in the region of fold line 22, opens an outer end of pilot hole 16 when the folding back of walls 13 and 14 moves semi-cylindrical grooves 17 and 18 from an aligned to a confronting relationship. A pair of semi-circular cutouts 23 and 24, formed respectively in body portions 11 and 12 adjacent bend lines 26 and 27, open the base end of pilot hole 16 when base portions 11 and 12 are bent relative to stand-off 15. Each base portion has "rosette" retainers 28 that provide interlocking projections that extend into and interlock with the material of panel 20.

Figure 3:
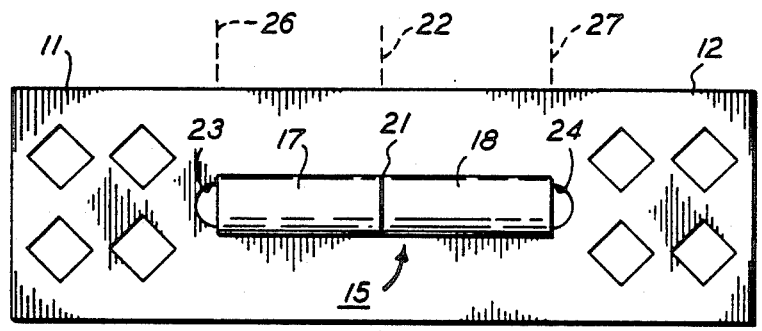
FIG. 3 is a plan view of a strip from which the bracket of FIG. 2 is formed.
Figure 4:
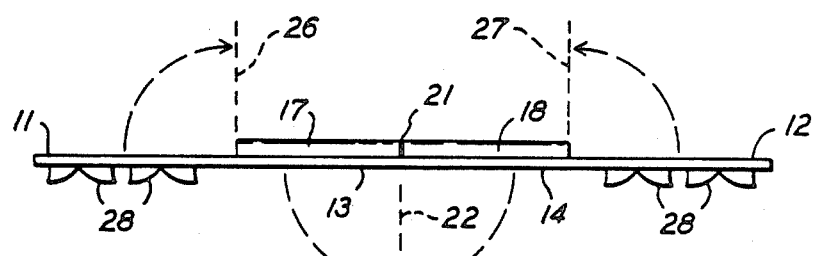
FIG. 4 is a side elevational view of the strip of FIG. 3.
Figure 5:
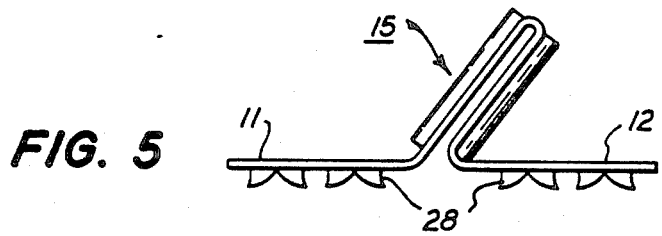
FIG. 5 is a side elevational view of a completed bracket having an obliquely angled stand-off.

An initially flat strip, as shown in FIGS. 3 and 4, is formed into bracket 10 by operations—not necessarily in the described order—that include: punching slit 21, semi-circular openings 23 and 24, and rosette retainers 28; forming semi-cylindrical bends 17 and 18; forming bends at lines 26 and 27; and folding back double walls 13 and 14 at fold line 22. Bends 26 and 27 are preferably parallel and supplementary so that base portions 11 and 12 are coplanar. Stand-off 15 can extend for different lengths merely by changing the distance between bends 26 and 27 in a work piece strip of suitable length. Stand-off 15 can also extend away from base portions 11 and 12 at an oblique angle, as shown in FIG. 5. The angle and length of stand-off 15 properly orients pilot hole 16 so that a fastener, such as screw 25, is accurately guided through panel 20 and into a fastening hole 31 in automobile body 30.

Rosette retainers 28 can be molded into panel 20 when it is formed or can be later pressed into panel 20. Once panel portions 11 and 12 are interlocked with panel 20, double walls 13 and 14 are held in their folded-together position and cannot spread apart as a fastener enters pilot hole 16.

I claim:
1. An automotive bracket comprising:
   a. a central region of a flat strip being bent back on itself at a fold line to form a double-walled stand-off with parallel and confronting walls;
   b. a groove formed in each wall of said stand-off, each of said grooves being parallel with and in between side edges of said strip to extend along the length of said stand-off, said grooves being arranged to confront each other and closely surround a generally cylindrical pilot hole for receiving a fastener extending through said stand-off;
   c. base portions of said bracket extending in a plane from each of said stand-off walls, said base portions being adapted to engage and interlock with an automotive panel so that said stand-off bridges a distance between said panel and an automotive body;
   d. said grooves being cut off at said fold line of said stand-off for opening a fold line end of said pilot hole between said grooves; and
   e. cutouts in each of said base portions adjacent said grooves for opening a base end of said pilot hole between said grooves.
2. The bracket of claim 1 wherein said double walls are each perpendicular to said base portions.
3. The bracket of claim 7 wherein the interlock of said base portions with said panel holds said double walls together against any spreading apart.
4. The bracket of claim 1 wherein angles between said base portions and respectively adjacent ones of said double walls are supplementary.
5. The bracket of claim 1 wherein each of said grooves are semi-cylindrical in shape.
6. An automotive bracket comprising:
   a. a single strip of material forming a first base portion, a stand-off, and a second base portion;

b. said first and second base portions being coplanar and disposed for engaging a surface of an automotive panel and interlocking with said panel;

c. said stand-off having double walls bent respectively outward from each of said base portions to extend away from said surface of said panel and being folded back against and parallel with each other at a fold line spaced from said base portions said stand-off being arranged to extend between said panel and an automotive body to which said panel is mounted;

d. each of said double walls of said stand-off having a confronting groove that extends from a respective one of said base portions outward to said fold line, said confronting grooves being parallel with and in between side edges of said strip, and said confronting grooves closely surrounding a generally cylindrical pilot hole for receiving a fastener extending through said panel, said base, and said stand-off and into said automotive body supporting said panel;

e. a slit between said grooves at said fold line arranged so that when said double walls of said stand-off are folded back against each other, said slit opens a fold line end of said pilot hole between said grooves; and f. cutouts in each of said base portions adjacent said grooves so that said cutouts open a base end of said pilot hole between said grooves.

7. The bracket of claim 6 wherein said grooves are semi-cylindrical in shape.

8. The bracket of claim 7 wherein said cutouts are semi-circular in shape.

9. The bracket of claim 6 wherein said double walls are each perpendicular to said base portions.

10. The bracket of claim 6 wherein interlocking of said base portions with said panel prevents any movement of said double walls away from each other.

11. The bracket of claim 6 wherein angles between said base portions and respectively adjacent ones of said double walls are supplementary.

12. An automotive bracket comprising:

a. a strip of material having two bends equally spaced on opposite sides of a fold line to form a double-walled stand-off positioned between a pair of base portions and extending away from said base portions to said fold line said base portions being adapted to engage and interlock with a surface of an automotive panel from which said stand-off extends to an automotive body supporting said panel;

b. bent-together walls of said stand-off being parallel with each other and each having a confronting groove that is parallel with and in between side edges of said strip so that said confronting grooves extend from said base portions to said fold line and closely surround a generally cylindrical pilot hole extending from said base portions through said stand-off to said fold line for receiving and guiding a fastener extending through said panel and said stand-off and into said automotive body;

c. a slit between said grooves at said fold line so that said slit opens a fold line end of said pilot hole when said stand-off walls are bent together; and d. cutouts in each of said base portions adjacent said grooves so that said cutouts open a base end of said pilot hole.

13. The bracket of claim 12 wherein said grooves are semi-cylindrical in shape.

14. The bracket of claim 13 wherein said cutouts are semi-circular in shape.

15. The bracket of claim 12 wherein angles between said base portions and said stand-off are supplementary.

16. The bracket of claim 12 wherein said walls of said stand-off are each perpendicular to said base portions.

* * * * *